United States Patent [19]

Rapp et al.

[11] Patent Number: 5,439,527
[45] Date of Patent: Aug. 8, 1995

[54] METHOD FOR FIXING BLAST/CLEANING WASTE

[75] Inventors: D. J. Rapp, Dubuque, Iowa; Redmond R. Clark, North Barrington, Ill.; Michael McGrew, Novi, Mich.

[73] Assignee: The TDJ Group, Inc., Cary, Ill.

[21] Appl. No.: 148,587

[22] Filed: Nov. 4, 1993

Related U.S. Application Data

[63] Continuation-in-part of Ser. No. 750,959, Aug. 28, 1991, Pat. No. 5,266,122.

[51] Int. Cl.$^6$ .................................................. B08B 7/00
[52] U.S. Cl. .......................................... 134/7; 51/307; 51/308; 134/38
[58] Field of Search ............... 134/7, 38; 15/95, 3.5; 51/307, 308, 319

[56] References Cited

U.S. PATENT DOCUMENTS

| | | | |
|---|---|---|---|
| 3,155,466 | 11/1964 | Grütter et al. | 51/308 |
| 4,012,320 | 3/1977 | Conner et al. | 210/52 |
| 4,017,417 | 4/1977 | Clark et al. | 252/301 |
| 4,113,504 | 9/1978 | Chen et al. | 106/97 |
| 4,174,293 | 11/1979 | Colombo et al. | 252/301 |
| 4,209,335 | 6/1980 | Katayama et al. | 106/89 |
| 4,222,889 | 9/1980 | Uerpmann | 252/301 |
| 4,249,949 | 2/1981 | Wooler et al. | 106/90 |
| 4,299,722 | 11/1981 | Stock et al. | 252/628 |
| 4,363,757 | 12/1982 | Köster et al. | 252/628 |
| 4,379,081 | 4/1983 | Rootham et al. | 252/628 |
| 4,416,810 | 11/1983 | Noakes | 252/628 |
| 4,424,148 | 1/1984 | Rosenstiel et al. | 252/628 |
| 4,432,666 | 2/1984 | Frey et al. | 405/129 |
| 4,461,722 | 7/1984 | Knieper et al. | 252/628 |
| 4,464,200 | 8/1984 | Kuval | 106/90 |
| 4,537,710 | 8/1985 | Komarneni et al. | 252/628 |
| 4,603,516 | 8/1986 | Hoffman | 51/425 |
| 4,729,770 | 3/1988 | Higgins | 51/293 |
| 4,878,944 | 11/1989 | Rolle et al. | 75/25 |
| 4,906,408 | 3/1990 | Bouniol | 252/628 |
| 4,907,379 | 3/1990 | MacMillian | 51/426 |
| 5,037,479 | 8/1991 | Stanforth | 106/691 |

FOREIGN PATENT DOCUMENTS 59-95984  6/1984  Japan.

*Primary Examiner*—Melvyn J. Andrews
*Assistant Examiner*—Sean Vincent
*Attorney, Agent, or Firm*—Hill, Steadman & Simpson

[57] ABSTRACT

A method for blast cleaning metal and fixing the hazardous waste generated by blast cleaning. An abrasive cement in a sufficient amount is combined with the blast cleaning process, thereby reducing the leachability of the heavy metals and producing non-hazardous abrasive waste.

13 Claims, No Drawings

METHOD FOR FIXING BLAST/CLEANING WASTE

This is a continuation-in-part of application Ser. No. 07/750,959, filed Aug. 28, 1991, now U.S. Pat. No. 5,266,122.

BACKGROUND OF THE INVENTION

The present invention relates to a process for blast cleaning metal. More specifically, the present invention relates to a process for fixing hazardous waste generated during the blast cleaning process.

Blast cleaning of metal surfaces is tremendously important in enhancing the structural integrity and productive use of metal structures. During operations involving metal castings, metal coatings, or metal recoating, it is often necessary to use abrasive-type chemicals to clean the metal surfaces, remove major surface irregularities, and produce small surface irregularities that allow paints to adhere for corrosion control.

Typically, when abrasive cleaning a surface covered with a metal-based paint or a surface composed of certain metals like brass, abrasive grit (i.e., copper slag, steel grit, iron shot, coal-tar slag, silica, sand, etc.) is fired at the surface in a high velocity air stream. As the abrasive strikes the surface, the impact breaks loose the coating and/or abrades the metal surface itself.

With respect to the metal abrasives, most of the abrasives can be collected and re-used. However, some of the abrasive will shatter or break down. With non-metallics, the impact often shatters the grit particle. But in both cases, the blast residue will be composed of spent abrasives and a high volume of heavy metal residues.

Because these metals impact on human health and the environment, the United States Environmental Protection Agency (hereinafter "U.S.E.P.A.") and its state counterparts have established testing procedures to determine the amounts of soluble or leachable heavy metals that might escape into the environment. The testing procedures include the U.S.E.P.A.'s Toxicity Characteristic Leaching Procedure (hereinafter "TCLP") and the Neutral Leach Test (Indiana Department of Environmental Management). Both procedures attempt to simulate the progressive effects of water and landfill leachate on waste.

Based on these testing procedures, the U.S.E.P.A. and the states have established permissible levels of heavy metals that can be released into the environment. They include: lead (5.0 mg/l); cadmium (1.0 mg/l); and chromium (5.0 mg/l). Other heavy metals are regulated by individual states and the U.S.E.P.A.

When the blast residue exhibits levels of leachable lead, cadmium, chromium or other regulated metals that exceed allowable limits, regulatory authorities will classify the waste as special, industrial, or hazardous. Upon classification of waste into one of these categories, the regulatory agency typically requires that the waste material be managed with special care, which often means significantly higher costs to the waste generator. Further, management of the waste could include, but is not necessarily limited to, the following: special packaging for shipment, limitations in time and/or volumes allowed on-site, use of special hauling equipment, additional paperwork including tracking the material, use of specially permitted treatment facilities, use of specially permitted destruction facilities, use of specially permitted residue disposal facilities, and the requirement of special insurance coverage. It should be noted that the generators of such waste products may also be held liable for cleanup costs incurred in the event of waste spills or improper disposal.

The expense in complying with these types of waste disposal regulations can be quite expensive, but the alternative of non-compliance may be even more expensive. International and domestic insurers have substantially reduced the liability insurance coverage available with respect to these waste products, while substantially increasing the cost of available coverage. Typically, insurance coverage exclusions include compensation for losses due to willful violations of waste management regulations. Since the cost of cleanups and/or willful violations can be extraordinarily great, many waste generators choose compliance as the most desired waste management alternative.

There are basically two principal options available to waste generators desiring to comply with regulations for the disposal of waste. First, waste generators can manage waste in compliance with existing regulations or, in the alternative, they can alter their manufacturing process so as to produce smaller quantities of such waste or less hazardous waste. Recent regulatory changes instituted by the U.S.E.P.A. have escalated the costs of hazardous waste disposal in North America. With facility limitations and overall costs increasing, waste generators are faced with the prospect of changing their waste treatment process as a method of cost control. But at the same time, regulatory agencies are likely to formulate and implement even more stringent regulations that will act to reduce future harm to the environment.

In view of the aforementioned economic and social trends toward disposal of hazardous waste, alternative approaches for producing non-hazardous blast cleaning waste and/or minimum volumes of such waste would be of tremendous importance to waste generators.

SUMMARY OF THE INVENTION

The present invention provides a method for blast cleaning a metal surface. In particular, the present invention provides a method for fixing the metal-contaminated waste that is generated by blast cleaning. To this end, the present invention utilizes a method, wherein a sufficient amount of an abrasive unreacted hydraulic cement is used in an abrasive cleaning process to produce non-hazardous waste. Specifically, partially ground cements or cement-like materials of select particle sizes are applied to a selected metal surface. The abrasive effect causes the upper portion of the metal work surface to be removed and pulverizes the cement granules.

In the presence of water, the pulverized cement reacts and forms a surficial silica gel, which acts to bind the particulates together in a cementicious whole. This binding process also acts to bind the waste particulates in a matrix with an elevated pH. Further, the pH functions to minimize the solubility of the heavy metals, thereby resulting in the chemical fixation of the heavy metal constituents. The resulting waste products are rendered non-hazardous, and are, thus, suitable for disposal with no requirement for U.S.E.P.A. treatment permits.

In one embodiment of the present invention, the abrasive cement is used alone to blast clean the metal.

In a further embodiment, the abrasive cement is used with blast media to clean the metal.

In another embodiment, the abrasive cement in a sufficient amount is blended with blasting media to form an abrasive mixture. The abrasive mixture is then applied to a metal surface.

In an embodiment of the present invention, the abrasive cement is selected from a group of chemicals consisting of any form of hydraulic cement, ground cement clinker, and a mixture of hydraulic cements and cement clinker.

In another embodiment, the abrasive waste has a wetted pH between about 8.0–11.4.

In another embodiment, the method of the present invention is applied to structures designed for internal abrasive cleaning, including a blasting cabinet.

Additional features and advantages of the present invention will be apparent from the detailed description of the presently preferred embodiments.

DETAILED DESCRIPTION OF THE PRESENTLY PREFERRED EMBODIMENTS

The present invention provides a process for blast cleaning a metal surface. More specifically, the present invention provides a process for the treatment of blast cleaning waste contaminated with heavy metals, such as heavy metal contaminated paints, whereby non-hazardous abrasive waste is produced. To this end, the present invention utilizes a process that combines the blast cleaning process and various forms of partially ground hydraulic cements or cement-like substances in low percentages, thereby causing the cement to break down into a pulverized cement powder while abrading the metal surface. The fraction of cement that is added is a function of the expected contamination type, levels, and work-place conditions.

In the presence of water, the pulverized cement reacts by forming a surficial silica gel that ultimately acts to bind the particulates together in a cementicious whole. In the binding process, waste particulates are also bound or encapsulated in a matrix, resulting in an elevated pH of approximately 8.0–11.4. The high pH acts to minimize the solubility of the heavy metal constituents, resulting in the chemical fixing of the heavy metals. Further, upon disposal of the generated waste products, the binder continues to bind the heavy metal constituents both chemically and physically, even upon exposure to a concentrated acid that is used in a TCLP test.

The resulting waste material qualifies as non-hazardous under U.S.E.P.A. standards, both in a dry state or in a wetted/mixed/set state. The toxic contaminants are fixed through a series of water-initiated chemical reactions, including fixation by addition, fixation by substitution, and metasilicate formation. Wetting can be initiated by either controlled (on-site) efforts or by uncontrolled (environmental) sources at a disposal site. Further, the resulting waste material is also suitable for disposal or can be used as aggregate for certain types of concrete or as a feed stock in the cement manufacturing process.

In practicing this invention, the abrasive cement may be applied either alone or with blast media to a metal or non-metallic surface for the purpose of blast cleaning the metal, and fixing the waste generated during the blast cleaning process. The blast cleaning of the metal may be performed after applying the abrasive cement or, in the alternative, through the application of the abrasive cement. Further, the abrasive cement may be blended with the blast media to form an abrasive mixture, which is then applied to the metal surface.

Various hydraulic cements can be used as the primary abrasive cement. However, in terms of effect and cost, it is preferable to use partially ground Portland cement clinker. Further, as long as the grains have an abrasive capability, it is also possible to use Portland blast furnace cement, silica cement, fly-ash cement, etc.

By way of example, and not limitation, the following examples serve to further illustrate the principals of the present invention and its preferred embodiments.

EXAMPLE 1

Open Blasting of Bridge Surfaces

Open blasting studies were conducted on a bridge surface using 20–40 mesh coal slag abrasive, producing a residue of paint and spent abrasive. When the waste material was subjected to a TCLP analysis, the material was classified as hazardous waste because of the high levels of leachable chrome (12 mg/l).

In contrast, when the coal-slag abrasive was mixed with the abrasive additive, 25% 40–80 mesh coarse no. I Portland cement by weight, the resultant residue produced chrome levels of 1.1 mg/l and trace levels of lead and cadmium when analyzed using TCLP.

EXAMPLE 2

Open Blasting of Industrial Pipes

Open blasting of industrial pipes with leaded paints using a 20–40 coal slag abrasive produced a residue containing high levels of leachable lead (27.4 mg/l). Using TCLP criteria, this material was classified as hazardous waste. Upon modification of the abrasive to include 25% 40–80 coarse ground cement clinker (a partially completed Portland cement) and application to a surface with a similar coating, the resulting residue contained TCLP lead levels of 0.3 mg/l, a value well below the prescribed limits set by the U.S.E.P.A.

With respect to open blast operations, results suggest that the addition of low percentage granular cement or cement-like materials to an abrasive results in a pulverized powder and blast residue that would be classified as non-hazardous under TCLP criteria. These results are due to the binding effect of the cement on the metallic particulates, as well as a corresponding pH adjustment of the waste to approximately 8.0–11.4. Both the binding effect of the cement on the particulates and the pH adjustment act to reduce the solubility and leachability of leaded compounds in water. With the possible exception of wetting for dust control and/or structural stability, the waste material is suitable for disposal in non-hazardous waste landfills.

EXAMPLE 3

Blast Cleaning of Cast Metal Products

In the manufacture of cast metal products, molten metal is poured into sand molds, which are designed to allow gas and heat to escape as the metal cools and solidifies. When the metal is sufficiently cooled, the sand mold is removed and disposed of or recycled, while the casting is held for further cleaning. After use, the casting may have a rough surface with molding sand adhering to the metal. In such circumstances, the casting may be placed in a blast cabinet for abrasive cleaning and/or subjected to various hard-held abrasive cleaning processes. Such processes are designed to clean and smooth the casting surface for future use and sale.

In the blast cleaning process for brass castings, small metal chips may be removed from the casting due to abrasive impact, producing a contaminated spent abrasive. In contrast, iron and steel castings usually do not produce spent abrasives with large quantities of heavy metal waste, since most iron and steel castings have only trace amounts of these substances. However, in the case of brass, these castings may have more than 5% lead present, resulting in brass chips in the waste material with high levels of leachable lead.

In studies involving blast cabinet cleaning of brass castings with steel shot, a waste stream was produced containing high levels of brass fragments. The red brass that was produced contained 5% lead in moderately leachable forms. Based on a TCLP analysis, waste samples exhibited leachable lead levels in the 40-60 mg/l range. However, with the addition of 40-200 mesh no. I Portland cement to the abrasive in the cabinet, and in quantities equivalent to approximately 15% of the waste stream by weight, leachable lead levels declined to 0.1 mg/l. This value is well below the 5.0 mg/l limits set forth by the U.S.E.P.A.

Within the range of open and closed blasting processes as presented, it is possible to add various chemicals to the waste after the blasting is completed. The addition of appropriate amounts of cement, lime, kiln dust, and other materials may produce the effects of waste stabilization as described above. However, under U.S.E.P.A. regulations, the addition of chemicals after generation of waste for purposes of treatment requires one of several types of treatment permits. The disadvantages are that these permits are time-consuming and expensive to obtain.

The utility of the present invention lies in the use of a virgin chemical feed stock in combination with a blast abrasive. This process does not require agency approval prior to being used. Accordingly, the use of a "pre-treated" abrasive allows the waste generator to avoid permit requirements that regulate post-generation processes.

The abrasive mixture containing hydraulic cement material can be prepared by reducing the raw material to particulate or granular material in an appropriate size range by using a single or multiple stage roll crusher, a horizontal shaft impact crusher, a vertical shaft impact crusher, a single or multiple stage ball mill, a hammer mill or a single or multiple stage (deck) vibrating screen apparatus.

Although the present invention is directed towards the surface preparation in the recoating of bridges, ships, pipelines, and tanks, as well as abrasive surface preparation in foundries, it is contemplated that the method of the present invention can be utilized in other similar processes.

As used herein, the term "hydraulic cement material" includes hydraulic cement, ground cement clinker, Portland blast furnace cement, silica cement, cement clinker and fly ash cement.

It should be understood that various changes and modifications to the presently preferred embodiments described herein will be apparent to those in the art. Such changes and modifications can be made without departing from the spirit and scope of the present invention and without diminishing its attendant advantages. It is, therefore, intended that such changes and modifications be covered by the appended claims.

We claim:

1. A method for blast cleaning non-metallic surfaces comprising the steps of:
    directing a blast of abrasive mixture containing hydraulic cement material onto a non-metallic surface covered with heavy metal contaminated paint to be removed and thereby abrasively removing said heavy metal contaminated paint from said non-metallic surface, said heavy metal contaminated paint removed from said surface containing hazardous residue; and
    chemically fixing said hazardous residue with said hydraulic cement material employed in the blasting to produce a non-hazardous waste product.

2. A method for blast cleaning a surface comprising the steps of:
    reducing raw hydraulic cement material to an abrasive mixture having particles in a selected size range using a roll crusher;
    directing a blast of said abrasive mixture containing hydraulic cement material onto a surface covered with a material to be removed and thereby abrasively removing said material from said surface, said material removed from said surface containing hazardous residue; and
    chemically fixing said hazardous residue with said hydraulic cement material employed in the blasting to produce a non-hazardous waste product.

3. A method as claimed in claim 2 wherein the step of reducing said raw hydraulic cement material to an abrasive mixture is further defined by using a single stage roll crusher.

4. A method as claimed in claim 2, wherein the step of reducing said raw hydraulic cement material to an abrasive mixture is further defined by using a multiple stage roll crusher.

5. A method for blast cleaning a surface comprising the steps of:
    reducing raw hydraulic cement material to an abrasive mixture having particles in a selected size range using a horizontal shaft impact crusher;
    directing a blast of said abrasive mixture containing hydraulic cement material onto a surface covered with a material to be removed and thereby abrasively removing said material from said surface, said material removed from said surface containing hazardous residue; and
    chemically fixing said hazardous residue with said hydraulic cement material employed in the blasting to produce a non-hazardous waste product.

6. A method for blast cleaning a surface comprising the steps of:
    reducing raw hydraulic cement material to an abrasive mixture having particles in a selected size range using a vertical shaft impact crusher;
    directing a blast of said abrasive mixture containing hydraulic cement material onto a surface covered with a material to be removed and thereby abrasively removing said material from said surface, said material removed from said surface containing hazardous residue; and
    chemically fixing said hazardous residue with said hydraulic cement material employed in the blasting to produce a non-hazardous waste product.

7. A method for blast cleaning a surface comprising the steps of:

reducing raw hydraulic cement material to an abrasive mixture having particles in a selected size range using a ball mill;

directing a blast of said abrasive mixture containing hydraulic cement material onto a surface covered with a material to be removed and thereby abrasively removing said material from said surface, said material removed from said surface containing hazardous residue; and chemically fixing said hazardous residue with said hydraulic cement material employed in the blasting to produce a non-hazardous waste product.

8. A method as claimed in claim 7 wherein the step of reducing said raw hydraulic cement material to an abrasive mixture is further defined by using a single stage ball mill.

9. A method as claimed in claim 7 wherein the step of reducing said raw hydraulic cement material to an abrasive mixture is further defined by using a multiple stage ball mill.

10. A method for blast cleaning a surface comprising the steps of:

reducing raw hydraulic cement material to an abrasive mixture having particles in a selected size range using a hammer mill;

directing a blast of said abrasive mixture containing hydraulic cement material onto a surface covered with a material to be removed and thereby abrasively removing said material from said surface, said material removed from said surface containing hazardous residue; and chemically fixing said hazardous residue with said hydraulic cement material employed in the blasting to produce a non-hazardous waste product.

11. A method for blast cleaning a surface comprising the steps of:

reducing raw hydraulic cement material to an abrasive mixture having particles in a selected size range using a vibrating screen apparatus.

directing a blast of said abrasive mixture containing hydraulic cement material onto a surface covered with a material to be removed and thereby abrasively removing said material from said surface, said material removed from said surface containing hazardous residue; and chemically fixing said hazardous residue with said hydraulic cement material employed in the blasting to produce a non-hazardous waste product.

12. A method as claimed in claim 11 wherein the step of reducing said raw hydraulic cement material to an abrasive mixture is further defined by using a single stage vibrating screen apparatus.

13. A method as claimed in claim 11 wherein the step of reducing said raw hydraulic cement material to an abrasive mixture is further defined by using a multiple stage vibrating screen apparatus.

* * * * *